United States Patent
Huang

(10) Patent No.: US 6,475,061 B1
(45) Date of Patent: Nov. 5, 2002

(54) METHOD AND APPARATUS FOR CONTROL OF MITES IN A BEEHIVE

(75) Inventor: Zhiyong Huang, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 1 day.

(21) Appl. No.: 09/704,135

(22) Filed: Nov. 1, 2000

(51) Int. Cl.⁷ .......................... A01K 47/06; A01K 51/00
(52) U.S. Cl. .............................. 449/12; 449/1
(58) Field of Search ................ 449/3, 12, 55, 449/1

(56) References Cited

U.S. PATENT DOCUMENTS

| | | | |
|---|---|---|---|
| 3,683,432 A | 8/1972 | Musgrove | |
| 3,994,034 A | * 11/1976 | Damme et al. | 449/12 |
| 4,280,236 A | * 7/1981 | Herman | 449/5 |
| 4,739,531 A | * 4/1988 | Robson | 449/47 |
| 5,069,651 A | 12/1991 | Arndt | |
| 5,162,014 A | 11/1992 | Moore et al. | |
| 6,037,374 A | 3/2000 | Kochansky et al. | |

FOREIGN PATENT DOCUMENTS

| | | | | |
|---|---|---|---|---|
| DE | 2626260 | * | 3/1977 | A01K/47/06 |
| DE | 158733 | * | 2/1983 | A01K/51/00 |
| DE | 3308017 | * | 3/1984 | A01K/51/00 |
| WO | 9214355 | * | 9/1992 | A01K/51/00 |

OTHER PUBLICATIONS

Sammataro, D. et al., Ann Rev Entomol 45 519–548 (2000).
Calis et al, Apiacta XXXII, 65–71 (1997).
Rosenkranz, P., et al., Apidologie, V28, N6 (Nov.–Dec.) pp. 427–437 (1997) (Abstract).
Harbo, J.R., Journal of apicultural Research, V32, N3–4, pp. 159–165 (1993) (Abstract).
Cunningham LNE96–066 (1996).

* cited by examiner

Primary Examiner—Peter M. Poon
Assistant Examiner—Son T. Nguyen
(74) Attorney, Agent, or Firm—Ian C. McLeod

(57) ABSTRACT

A modified comb (10, 10A, 10B or 10C) for heating drone bee larvae and pupae in a hive (100) is described. The comb includes wires (11, 11A, 11B, 11C, 11D) for treat the drone larvae and pupae(P) to kill the mites (M) on the larvae and pupae. By this method, the mites are prevented from infesting the hive.

30 Claims, 6 Drawing Sheets

METHOD AND APPARATUS FOR CONTROL OF MITES IN A BEEHIVE

CROSS-REFERENCE TO RELATED APPLICATION

None

STATEMENT REGARDING FEDERALLY SPONSORED RESEARCH OR DEVELOPMENT

None

BACKGROUND OF THE INVENTION (1) Field of the Invention

The present invention relates to a method and apparatus for selectively killing mites in a beehive. In particular, the present invention relates to an apparatus and method which focuses on the drone population in the hive.

(2) Description of Related Art

Honey bees (Latin name: *Apis mellifera* L., honey maker) are the most beneficial insects in the world. They have been producing honey, the earliest sweeteners, for thousands of years. They also provide other products, such as beeswax, which are used in cosmetics and for candle making; pollen, used as a health food; propolis and venom which are widely used as therapeutic agents for diseases. Most valuable of all, however, is the fact that bees pollinate the flowers they visit.

Honey bees play a critical role in U.S. agriculture. The value of crops requiring pollination by honey bees is estimated to be around $24 billion per year and commercial bee pollination was valued at $9.3 billion (Metcalf and Metcalf, Destructive and Useful Insects-Their Habits and Control, McGraw-Hill, New York 1993). In Michigan, bees play an even greater role because the fruits and crops in Michigan that rank in the top 10 nationally, including apples, cherries, blueberries, peaches, pears, strawberries and cucumbers, all depend on honey bee pollination for either fruit set or better yield and quality (USDA, 1976). The total value of these crops is estimated to be $272 million in 1997 in Michigan (Michigan Department of Agriculture, 1997). In addition, Michigan produces 7.6 million pounds of honey annually, which is valued at $5.7 million (average of five years' data: 1993–1997). The total value that bees contribute to Michigan agriculture is therefore over $300 million if one adds the value of other crops that benefit from pollination and of other bee-products such as pollen, beeswax and propolis.

Honey bees are social insects that live in colonies. There are three castes of bees in each colony, the queen bee, the drones, and the workers. The most important of these is the queen bee. She is the egg machine in the hive and lays 1,500 to 3,000 eggs per day, if there are enough worker bees to incubate them. Workers are all female, but are practically sterile because they cannot mate. In the rare case that they do become egg layers, their only offsprings are males. Workers perform all the work in the colony. They have a form of division of labor that is called "age-polyethism". Newly emerged workers clean comb cells for the first 2–3 days, then they become "nurses" and provide food to the immature stages of all three castes. They also care for the queen, feeding her "royal jelly" around the clock. They then spend time building new combs with wax secreted from their special glands on their abdomen. Next they process the nectar collected by foragers and dry them down and add enzyme to convert nectar into honey. Finally around 3 weeks of their life, they graduate from home and become foragers, collecting nectar, pollen, water and propolis for various uses in the hive. The workers live on average 4–6 weeks during summer, much shorter than the 3–5 year life span of the queen.

Drones do not contribute anything to the welfare of the colony. Their sole task is to mate with the new queens and they die during the process. They are in a sense dispensable in normal colonies so many beekeepers cut and remove drone brood because they are considered to be a waste of energy to maintain.

The major mite, called the varroa mite (*Varroa jacobsoni*) is considered the largest problem on a global scale. The mites infest the brood in the hive (drone and worker) and emerge with the young bees to repeat the cycle. The drones are twelve (12) times more likely to be infested compared to workers while in the brood combs (Sammataro, D. et al., Ann Rev Entomol 45 519–548 (2000).

Various trapping methods using drone bees have been tried as described by Calis et al, Apiacta XXXII, 65–71 (1997). This is a very labor intensive method and is not universally used. See also Zu den Deutsche Uberstetzung Sept. 29, 1999.

Various chemicals have been used to control mites in honeybees in the hive. U.S. Pat. No. 6,037,374 to Kochansky et al discuss the various compositions which are available. The problem is that the chemicals, while toxic to the mites, can leave residues in the honey, and are usually toxic to bees. The mites can also become resistant to the chemicals. Thus for these reasons chemical treatment of hives alone is not a desirable method of killing the mites.

U.S. Pat. No. 5,069,651 to Arndt discloses a different approach using an apparatus which attaches to the hive. In this apparatus a blower on top of the hive is used to heat air which is introduced into the bottom of the hive. The temperature of the air is maintained at 120° to 130° F. (48.9° to 54.4° C.) for fifteen minutes. Vegetable oil is also inserted into the hive through the blower to facilitate the killing of the mites, presumably to block the breathing system of the mites (spiracles). The vegetable oil can affect the honey and the bees. There is no experimental data and it is believed that this apparatus has not found widespread use, probably because it is too expensive and labor intensive.

U.S. Pat. No. 5,162,014 to Moore et al describes the use of magnetism to combat the mites. This method has not found widespread use and it is uncertain how the mites are affected by magnetism.

Other related prior art is described in Rosenkranz, P., et al., Apidologie, V28, N6 (November –December) pages 427–437 (1997); Kuenen, L. P. S., et al., Journal of Insect Behavior, V10, N2 (March), Pages 213–228 (1997); Harbo, J. R., Journal of Apicultural Research, V32, N3–4, pages 159–165 (1993); Cunningham LNE96–066 (1996). One art also describes a general heating of the whole hive to control mites. U.S. Pat. No. 3,683,432 to Musgrove describes heating elements for the comb foundation for heating the honey in the hive to feed the bees in the winter.

What is needed is a method and apparatus which allows the infested bees to be selectively treated in the hive without injury to the remaining bees or contamination of the honey.

SUMMARY OF THE INVENTION

The present invention relates to a method for controlling mites which infect and kill honey bees in a hive which comprises:

selectively directly electrifying a separate comb containing drone larvae and pupae in the hive which kills the mites and wherein remaining combs and bees in the hive are not electrified.

The present invention also relates to a method for controlling mites which infect and kill honey bees in a hive which comprises:

(a) providing a comb for drone bees in the hive, wherein the comb comprises a support member for the comb, and resistance elements which are heated by providing a current through the elements; and (b) providing the current through the elements in the comb to selectively heat the comb containing the larvae and pupae of drone bees to a temperature which kills the mites, and wherein remaining honey combs and bees in the hive are not directly heated.

The present invention also relates to a comb for supporting drone larvae and pupae in a hive which comprises:

(a) a support member providing a foundation for cells on at least one face thereof for production of combs by worker bees and for drone bee egg laying by a queen bee in the cells and subsequently drone larvae and pupae from the eggs in the cells in the comb; and (b) electrical means adjacent to or in the support member so as to allow selective treatment of the drone larvae and pupae and mites on the drone larvae and pupae to kill the mites.

The present invention also relates to a comb for supporting drone larvae and pupae in a hive which comprises:

(a) a frame defining the margins of the comb and providing support for mounting the comb in the hive;

(b) a support member mounted in the frame providing a foundation for cells on at least one face thereof for production of cells by worker bees and drone bee egg laying by a queen bee in the cells and subsequently growth of drone larvae and pupae from the eggs in the cells in the comb; and (c) electrical elements mounted across the support member, wherein the elements can be electrically connected to a power source to directly heat the drone larvae and pupae to kill any mites on the drone larvae and pupae.

The present invention further relates to a honey beehive which comprises:

(a) a housing;

(b) at least one honeycomb for holding the honey produced by bees in the housing;

(c) a drone comb for supporting drone eggs, larvae and pupae in the beehive which comprises:

(1) a support member which provides a foundation for cells on at least one face thereof for production of cells by worker bees or a comb for drone bee egg laying by a queen bee in the cells in the hive and subsequently drone larvae and pupae from the cells in the cells of the combs; and (2) electrically conductive means on or in the support member to heat the drone larvae and pupae;

(d) an electrical power source connected to the electrically conductive means; and (e) control means for periodically activating the electrical power source and conductive means to kill the mites in the drone comb.

The present invention also relates to a support member for use in a beehive, which support member provides a foundation or a comb for drone cells on at least one face thereof for production of cells by worker bees and drone bee egg laying by a queen bee in the cells and subsequently drone bee larvae and pupae from the eggs in the cells of the comb, the improvement which comprises:

electrically conductive means adjacent to the support member or within the support member, which conductive means can be electrically connected to a power source to directly treat the drone larvae and pupae in the cells to kill mites on the drone larvae and pupae.

Finally, the present invention relates to a kit which comprises:

(a) a support member which provides a foundation for cells on at least one face thereof for production of cells by worker bees or a comb for drone bee egg laying by a queen bee in a hive and subsequently drone bee larvae and pupae in the cells in the comb, wherein the foundation or comb is provided with electrically conductive means which conductive means can be electrically connected to a power source to kill the mites; and (b) a package for containing the support member; and (c) instructions for the use of the support member in the hive.

Objects

It is therefore an object of the present invention to provide a method and apparatus for the selective treatment of beehives in order to control the mites. In particular, it is an object of the present invention to treat the hive in a manner which does not reduce honey production or quality or require separated opening of the hive. Further, it is an object of the present invention to provide a method and apparatus which is inexpensive to construct and use and which is highly effective. These and other objects will become increasingly apparent from the following description and the drawings.

DESCRIPTION OF PREFERRED EMBODIMENTS

Figure 1:
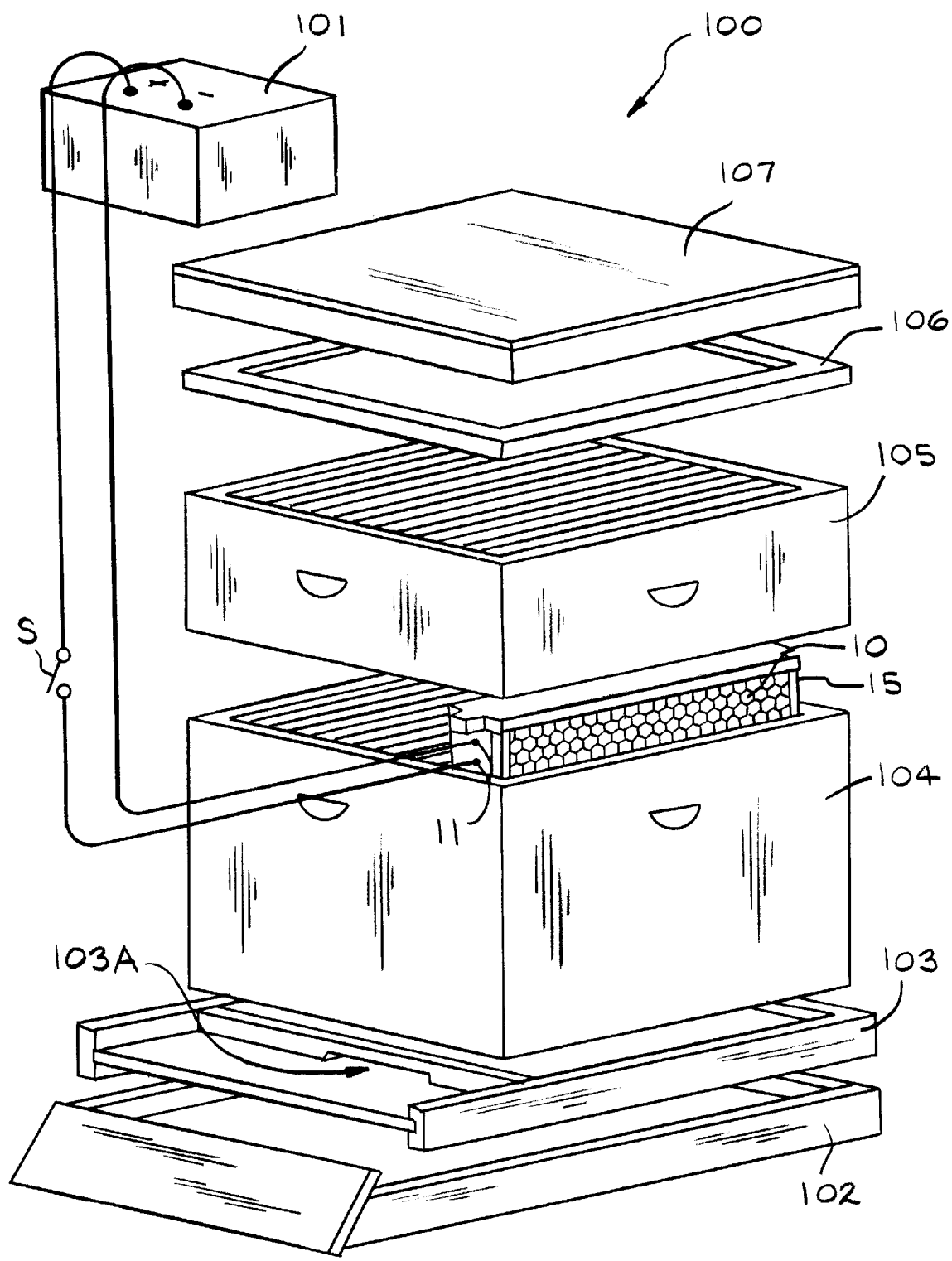
FIG. 1 is perspective overall view of a beehive 100 with drone bee wax comb 10 supported by a frame 15 which enables the periodic heat treatment of the drone bees in the comb 10 by means of a battery 101 and heating wires 11 within the comb 10.

FIG. 1 shows a conventional beehive 100 modified to practice the present invention. The hive 100 includes a hive stand 102, a bottom board spacer 103 with an entrance 103A for the bees, a brood chamber 104 and honey super 105 supporting a drone bee comb 10 within frame 15 of the present invention. Resistance wires 11 are electrically connected to a battery 101 outside of the hive 100. An inner cover 106 and an outer cover 107 are provided on top of the beehive 100.

The present invention functions to interrupt the parasite cycle by treating the drone bee larvae or pupae to rid them of the mites. This is accomplished by directly or indirectly treating, preferably by heating the drone bee larvae or pupae to kill the mites. Most preferably this is accomplished using resistance wires which are heated by a current from a power source, such as the battery 101, which is portable from hive 100 to another hive.

In bee colonies, combs similar in construction to comb 10 (not shown), are provided in the hive 100 to provide for the deposit of honey in the combs by the bees. These honey-bearing combs are not affected by the apparatus and method of the present invention. The hive 100 also contains one or more combs 10 which support the larvae and pupae from drone bee eggs which are deposited by the queen bee. The sole function of the drone bees in the colony is to mate with the queen bee, and thus they are to a certain degree expendable by the beekeeper. They are only useful for queen bee breeders. The drone bee eggs which are provided in the comb 10 by the queen bee are segregated from worker eggs because of the larger cell size. Plastic or wax foundations for building wax combs having outlines of larger hexagonal cell cross-sections (face to face) (0.7 cm) are recognized drone cells by the queen bee and the worker bees. The worker bee combs have a cross-section of 0.5 cm. The mites infest the drone bee pupae just before the cells containing the drone bee pupae are capped by the worker bees in the hive. Drone bee brood are about twelve (12) times more attractive to mites than the worker brood.

Figure 2:
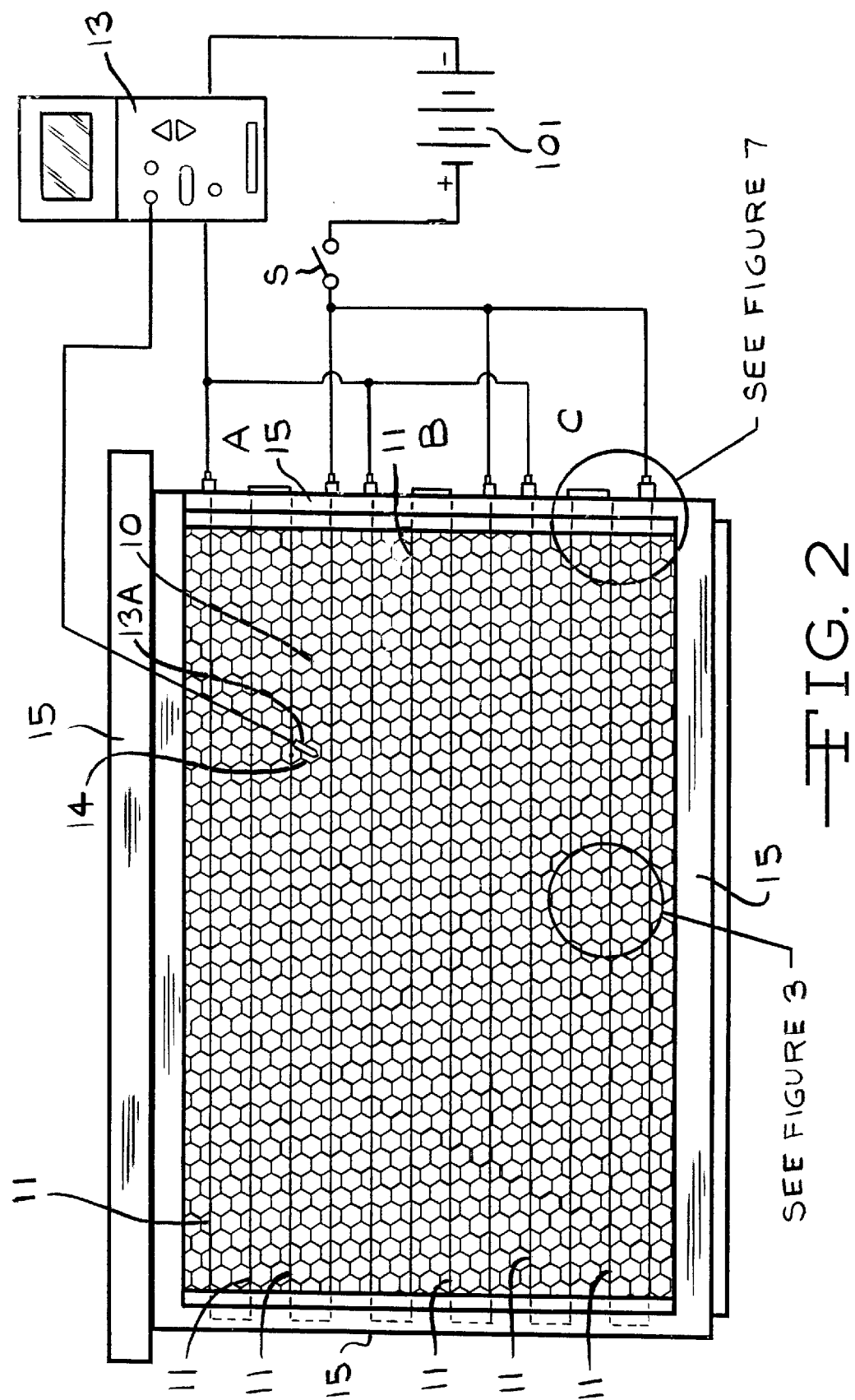
FIG. 2 is a front view of the comb 10 showing wires 11 provided adjacent to the face of a foundation 12 (FIG. 4) connected to the battery 101.

Referring to FIG. 2, the comb 10 is shown with resistance wires 11 provided in parallel across the face of the foundation 12 of the comb 10. The wires 11 are connected in parallel sets, designated as A, B and C so that the temperature is relatively constant over the face of the comb 10. In this embodiment, the wires 11, which are about 0.47 inch (1.2 cm) apart, are embedded in the (FIG. 3) foundation 12 (wax or plastic starter sheet with hexagonal cell imprints) of the comb 10. The wires 11 have a resistance of about 1.80 Ohm at a length of 220 mm and a diameter of 0.017 inch (0.43 mm).

It is noted that the drawings show the wires in a regular array of parallel resistance wires 11; however, numerous other spacings and patterns can be used. As shown in FIG. 2, a meter 13 can be provided in the circuit to measure the temperature of the comb with a probe 13A. The circuit can be actuated by a switch S or other manual or electronic control means. The meter 13 can also have a temperature probe 13A above the wires 11 to directly monitor the temperature of the comb or drone bee larvae or pupae P with mites M. The meter 13 can also measure current which is an indirect measure of temperature.

Figure 5:
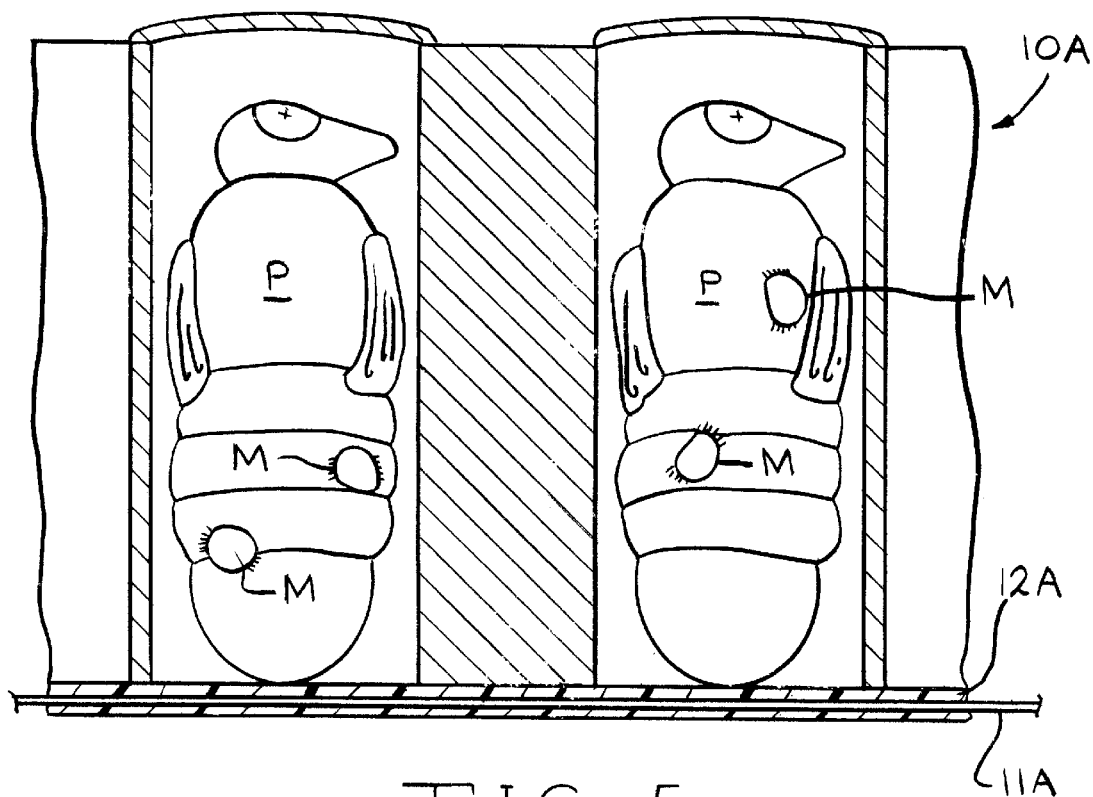
FIG. 5 is a front cross-sectional view of a comb 10A showing an alternate embodiment with an electrical resistance wire 11A embedded in a plastic or high melting point wax (45 to 55° C.) foundation 12A supporting the comb 10A containing the larvae and pupae P.

FIG. 5 shows the wires 11A embedded in a plastic foundation 12A in an alternate embodiment. The wires 11A can have the configuration of FIGS. 2 to 4 or 7. In this embodiment, the wires 11A can not interfere in any way with the development of the drone larvae or pupae P but can kill the mites M when heated.

Figures 4, 6:
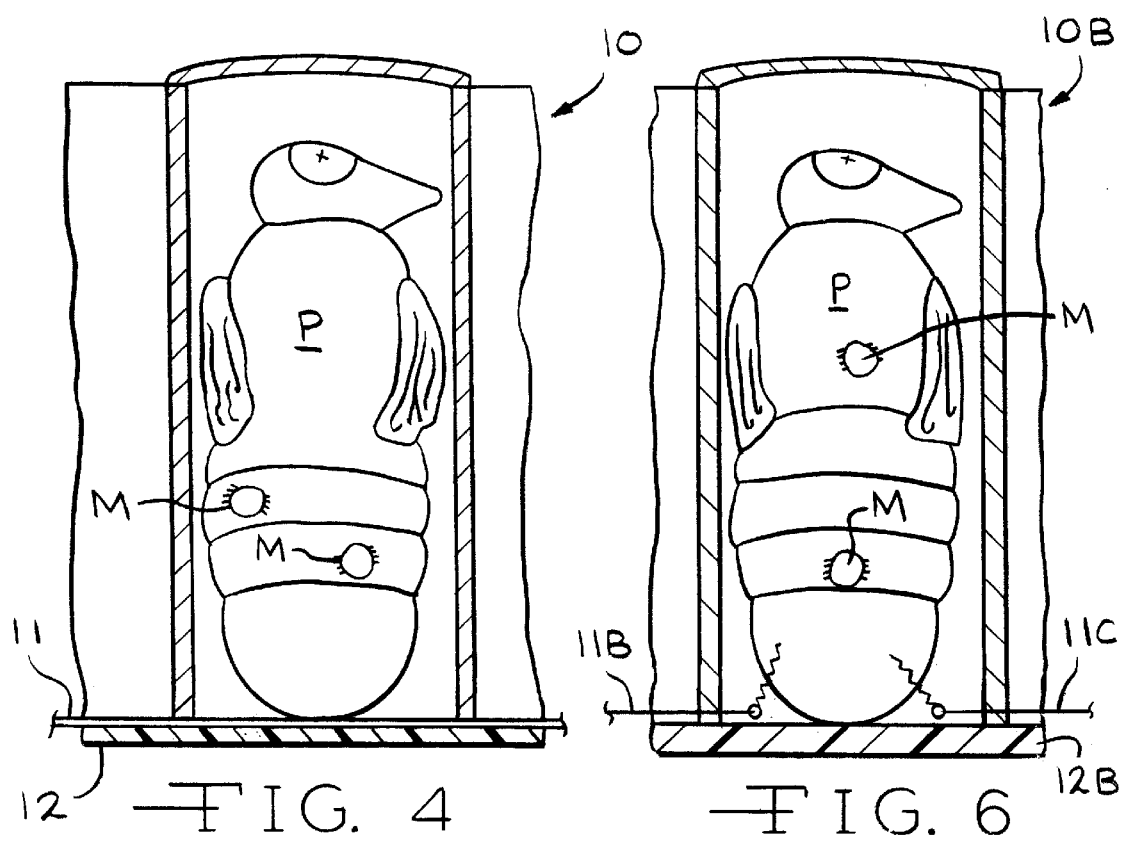
FIG. 4 is a front cross-sectional view of the enlarged portion of the comb 10 of FIG. 3, wherein an electrical resistance wire 11 laying in the foundation 12 containing-the larvae or pupae P.
FIG. 6 is a front cross-sectional view of a comb 10B showing an alternate embodiment with wires 11B and 11C which, when connected by a larva or pupa form a complete circuit, allowing electricity to flow through to kill the drone. Dead drones are cleaned by workers and all immature mite offspring die due to dehydration.

FIG. 6 shows the wires 11B and 11C in a position in comb 10B to create a spark above the foundation 12B adjacent to the pupae P which is conductive and heats due to the current. This is like the spark produced by a spark plug and requires a device which creates high voltage on a circuit sufficient to kill the drone larvae or pupae.

Figure 7:
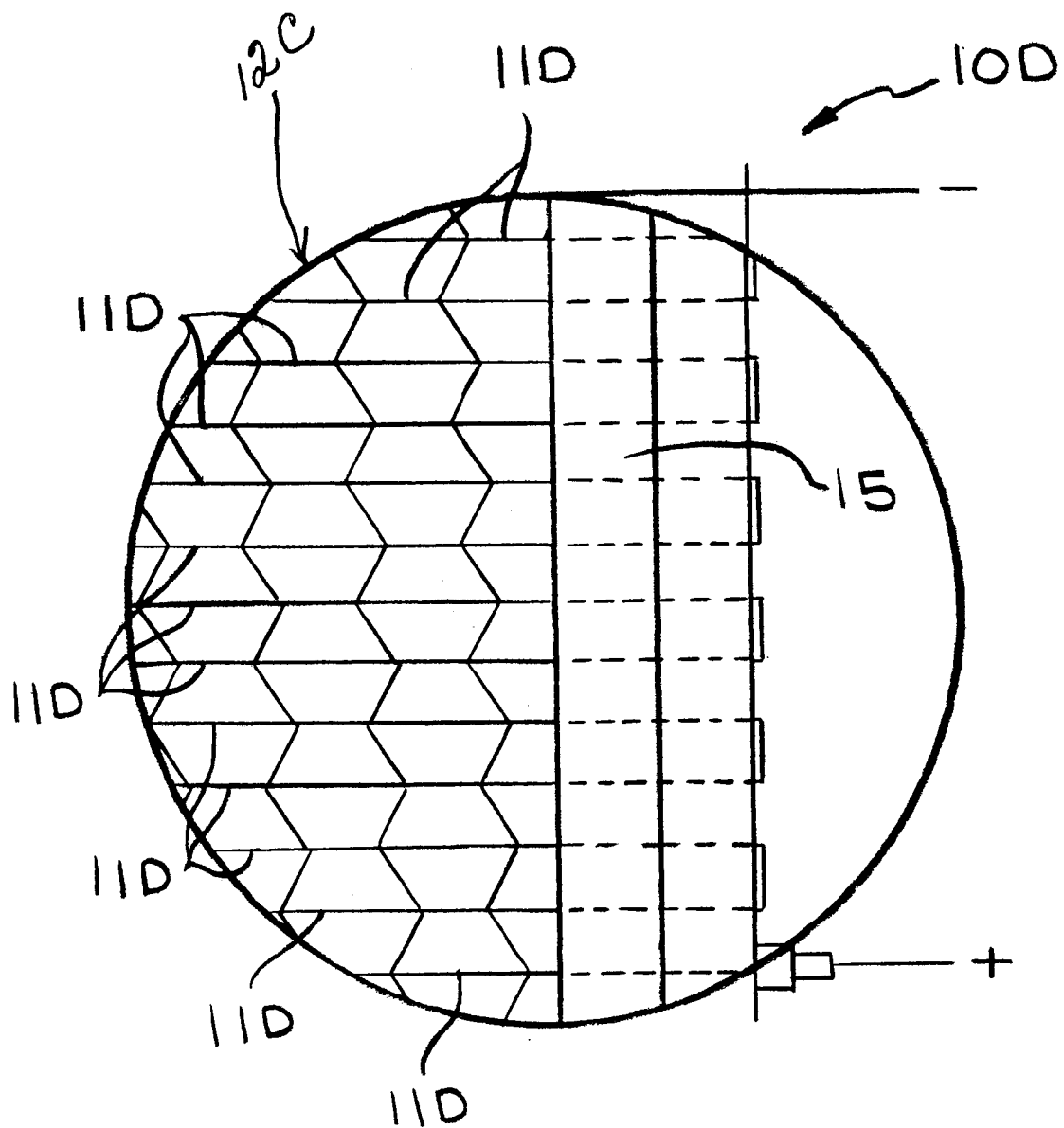
FIG. 7 is a front view in partial section from FIG. 2 of a comb 10D showing wires 11D laying on a foundation 12 (FIG. 4) beneath each cell of the comb 10D.

FIG. 7 shows many fine resistance wires 11D in parallel across the foundation 12C so as to be beneath each cell. The wires can be embedded in the foundation 12C as in FIG. 5 or lay on top of the foundation 12C below the wax comb deposited by the worker bees as in FIGS. 2 to 4. In this embodiment, all of the lines 11D are connected in series to a battery (not shown), designated as + or −, in FIG. 7.

Figure 8:
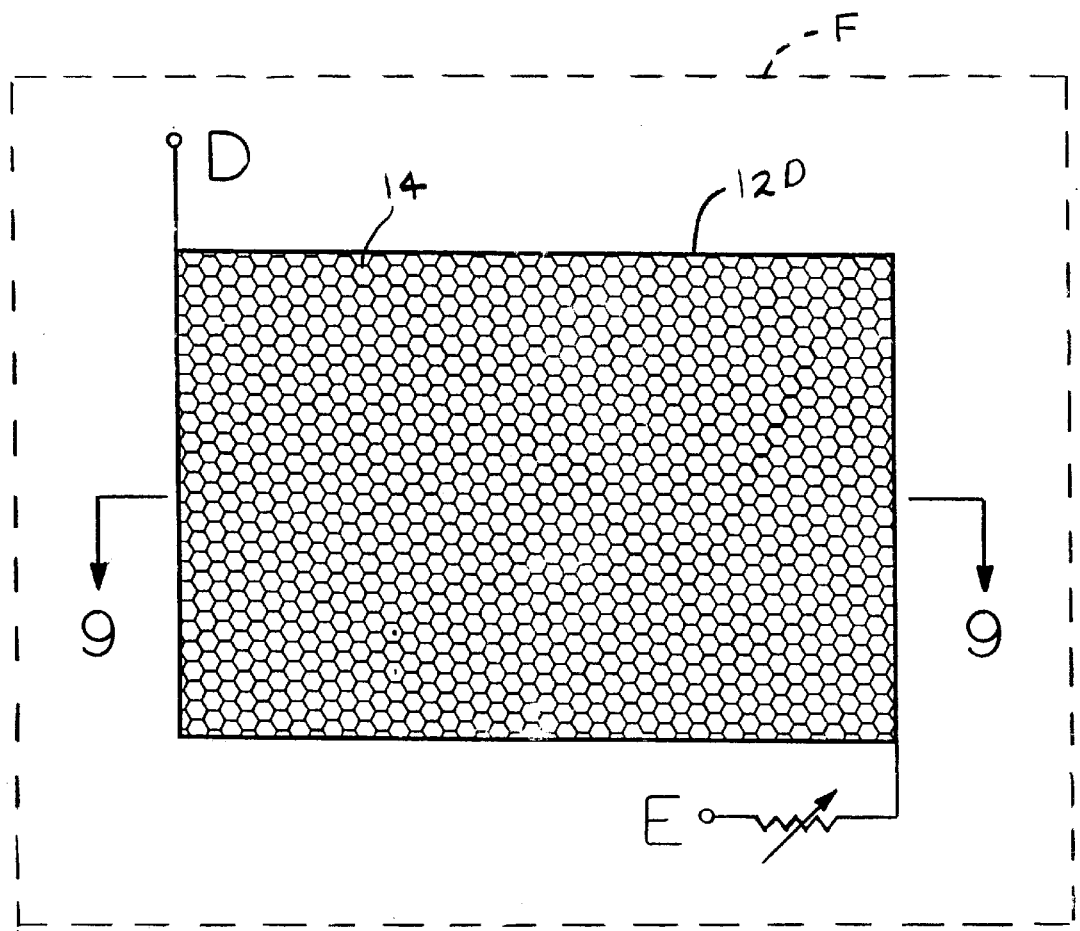
FIG. 8 is a front view of a foundation 12D with cell forming impressions 14 for deposit of the wax by the worker bees.
Figure 9:
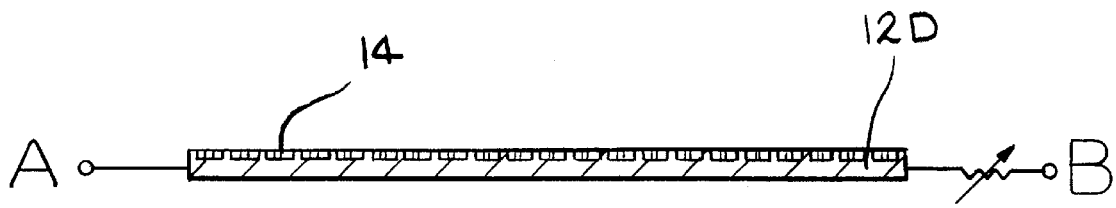
FIG. 9 is a side cross-sectional view along line 9—9 of FIG. 8.

An embodiment shown in FIGS. 8 and 9 is to provide a foundation or comb 12D which is all metal. The resistance can be built into the foundation 12D with cell impressions 14 for forming the cells are added externally, as shown in FIG. 8. If the foundation 12D has a variable resistance of significantly less than 1.7 ohm then a resistance R can be added so that the foundation 12D can heat in about 3 minutes with a battery connected at points D and E. The foundation 12D can be packaged in a container F (dotted lines) for shipment which includes instructions for use of the foundation 12D.

It will be appreciated that other power sources can be used and in particular AC and DC current. It will also be appreciated that the method and apparatus of the present invention could be used with other chemical or non-chemical treatments; however, this is not preferred for the reasons discussed previously.

The drone larvae and/or pupae are preferably heated in a period of about ten (10) days from sealing of the cells up to the young bees emerging from the cells. Thus the method is quite flexible in the time to apply the treatment.

Figure 3:
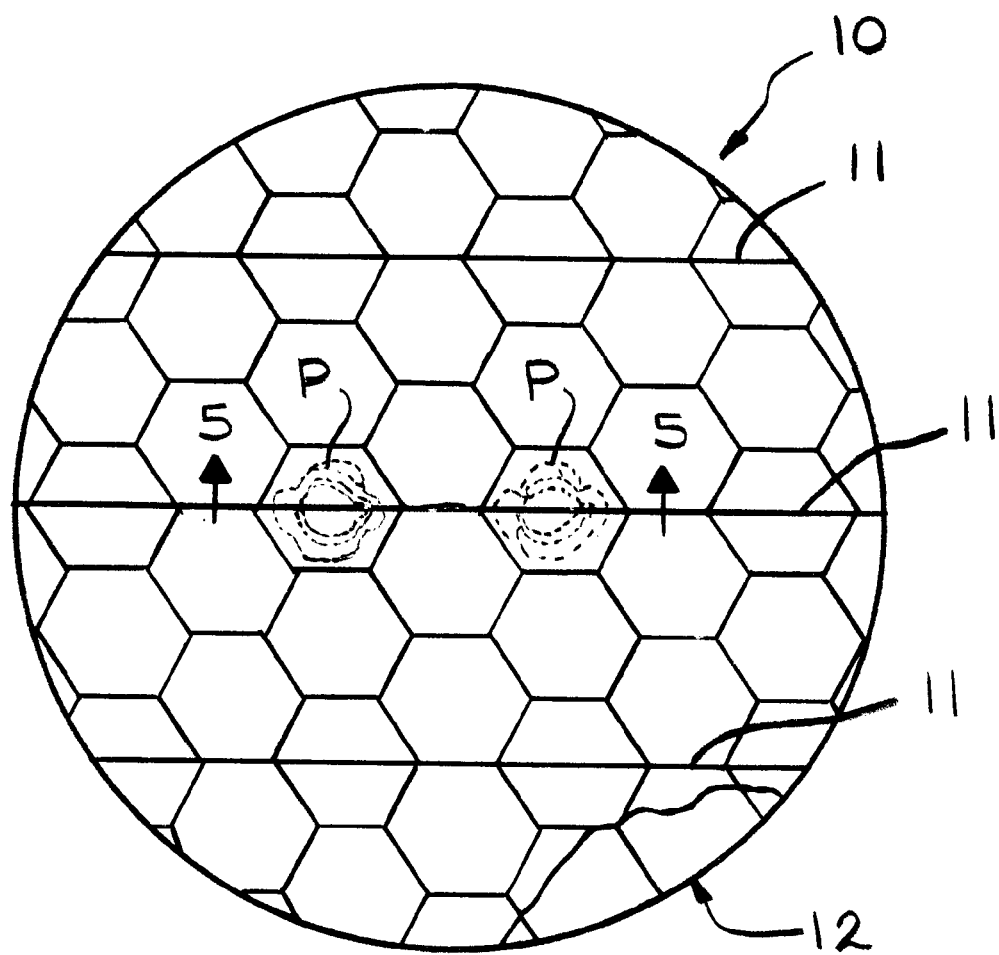
FIG. 3 is an enlarged view of a portion of the comb 10 showing drone bee larvae or pupae P (only two shown) and heating wires 11 laying in the foundation 12.

The following is an Example of the present invention with the wires 11 positioned as in FIGS. 2, 3 and 4.

EXAMPLE

One set of tests were performed on one day (Tests 1–3) and the rest of the tests (Tests 4–5) were performed the next day. A 12 V battery 101 was used in the test. Drone bee pupae were about 1–2 days prior to emerging as adults from the comb 10. Mites were naturally infested in the colony. The results are shown in Table 1. The cells were opened immediately (Tests 1–3), or after the temperature (T2) was reached for 3 minutes (Tests 4 and 5) and the mites scored as live or dead.

TABLE I

| Test # | Ambient ° C. Temperature | Resistance Wire 11 (Ohm) | Time to reach T2 (minutes) | Temp. T2 | Mortality (%) | Total mites tested (number) |
|---|---|---|---|---|---|---|
| Test 1 | 26 | 1.8 | 6 | 41° C. | 62.5 | 8 |
| Test 2 | 27 | 1.8 | 5 | 45° C. | 20 | 10 |
| Test 3 | 28 | 1.7 | 4 | 49° C. | 85.7 | 14 |
| Test 4 | 31 | 1.9 | 8 | 43° C. | 100 | 13 |
| Test 5 | 33 | 2.1 | 7 | 43° C. | 100 | 32 |

It takes more than one hour if all the wires are connected in series as one circuit (about 12 times across the frame, 6.5 Ohm). The temperature increased to 35° C. (from 27° C.) in 45 min. Thus the tests were performed in Sections A, B and C of the comb 10A. Only ⅓ of the frame was connected in sections A, B and C of FIG. 2 each time in Tests 1 to 5. The temperature of the drone bee pupae P reached over 40° C. within 4–8 minutes. The wax foundation 12 near the wire was hot and melted. The heat killed the mites and in Tests 4 and 5 the mortality was 100% (sample size N=45 mites).

The control data for the mites not heated by the wires 11 was as follows: for the first frame (Tests 1 to 3), 3 out of 36 were dead, a mortality of 8.3%; for the second frame (Tests 4 to 5), 4 out of 38 mites were dead, a mortality of 10.5%. The pooled data had a 9.5% mortality. The natural mortality was highly significantly different (G=Test, P<0.001) from the mortality when treated, and the results show that the present invention is highly effective in killing the mites. It is preferred to use a foundation 12 that is a good heat conductor and resistance wires 11 that have a smaller resistance (a total resistance of 2 ohm or less for the wires in the whole frame).

It will be appreciated that the foundation with the drone larvae and pupae in the cells can be removed from the hive and treated externally. This is not preferred.

It is intended that the foregoing description be only illustrative of the present invention and that the present invention be limited only by the hereinafter appended claims.

I claim:

1. A method for controlling mites which infect and kill honey bees in a hive which comprises:

selectively directly electrifying a comb with a plurality of drone bee cells containing drone larvae and pupae in the hive which further includes a plurality of combs for honey, wherein the electrifying kills the mites and wherein the plurality of combs for the honey and bees in the hive are not electrified.

2. The method of claim 1 wherein the electrifying is by an electrical current in a conductor within the comb with the plurality of drone bee cells which current produces a temperature in the conductor which kills the mites and the drone larvae and pupae in the drone bee cells.

3. The method of claim 2 wherein the temperature is at least about 44° C.

4. The method of claim 2 wherein the temperature is between about 44 and 45° C. so that the drone larvae and pupae are essentially uninjured.

5. A method for controlling mites which infect and kill honey bees in a hive which comprises:

(a) providing a comb with a plurality of drone bee cells containing drone larvae and pupae in the hive which further includes a plurality of combs for honey, wherein the comb comprises a support member for the comb, and electrical resistance elements adjacent to or within the drone bee cells in the comb which are heated by providing a current through the electrical resistance elements; and (b) providing the current through the electrical resistance elements in the comb to selectively directly heat the comb containing the drone larvae and pupae to a temperature which kills the mites, and wherein the plurality of combs for the honey and bees in the hive are not directly heated.

6. The method of claim 5 wherein the temperature kills the mites and the drone larvae and pupae.

7. The method of claim 5 or 6 wherein the temperature is at least about 44° C.

8. The method of claim 6 wherein the temperature is between about 44 and 45° C. so that the drone larvae and pupae are uninjured.

9. The method of claim 5 wherein the comb further includes a means for measuring temperature mounted on or within the comb or a means for measuring current connected to the electrical resistance elements to determine the temperature of the drone bee cells during application of the current through the electrical resistance elements.

10. A comb for supporting drone larvae and pupae in the hive, which further includes a pluraligy of combs, which comprises:

(a) a support member providing a foundation for drone bee cells on at least one face thereof for production of the comb by worker bees for drone bee egg laying by a queen bee in the drone bee cells of the comb and subsequently the drone larvae and pupae from the eggs in the drone bee cells in the comb; and (b) means for providing electricity adjacent to or within the support member so as to allow selective direct treatment of the drone larvae and pupae and mites on the drone bee larvae and pupae in the drone bee cells in the comb to kill the mites and wherein the plurality of combs for honey and bees in the hive are not electrified.

11. The comb of claim 10 wherein the means for providing the electricity are heating members which are positioned across the face or within the support member wherein resistance of the heating members to current produce the heat across the face or within the support member.

12. The comb of claim 10 wherein the means for providing the electricity provides a spark adjacent to the drone larvae and pupae in the drone bee cells in the comb.

13. The comb of claim 10 which further includes a means for measuring temperature mounted on or within the support member or a means for measuring current connected to the means for providing electricity to determine the temperature of the drone bee cells during application of the means for providing electricity to or within the support member.

14. A comb for supporting drone larvae and pupae in a hive, which further includes a plurality of combs, which comprises:

(a) a frame defining the margins of the comb and providing support for mounting the comb in the hive;

(b) a support member mounted in the frame providing a foundation for drone cells on at least one face thereof for production of drone cells by worker bees and drone bee egg laying by a queen bee in the cells and subsequently the growth of drone larvae and pupae from the drone bee eggs in the drone cells of the comb; and (c) electrical elements mounted across the support member, wherein the elements can be electrically connected to a power source to selectively and directly heat the drone larvae and pupae in the drone cells of the comb to kill any mites on the drone larvae and pupae and wherein the plurality of combs for honey and bees in the hive are not electrified.

15. The comb of claim 14 wherein the elements are mounted in parallel across the face of the support member.

16. The comb of claim 14 wherein the elements are mounted within the support member.

17. The comb of claim 14 wherein the elements provide a spark gap between ends of the elements adjacent to the cells.

18. The comb of claim 17 wherein the elements are resistance heating elements.

19. The comb of claim 14 which further includes a means for measuring temperature mounted on or within the support member or a means for measuring current connected to the electrical elements to determine the temperature of the drone bee cells when the elements are electrically connected to the power source.

20. A honey beehive which comprises:

(a) a housing;

(b) at least one honeycomb for holding the honey produced by bees in the housing;

(c) at least one drone bee comb for supporting drone bee eggs and subsequently drone larvae and pupae in the beehive which comprises:

(1) a support member which provides a foundation for drone bee cells on at least one face thereof for production of drone bee cells by worker bees for a comb for drone bee egg laying by-a queen bee in the drone bee cells in the hive and subsequently the drone larvae and pupae in the drone bee cells of the drone bee comb; and (2) means for conducting electricity on or in the support member to heat the drone larvae or pupae in the drone bee cells in the drone bee comb;

(d) an electrical power source connected to the means for conducting electricity; and (e) means for periodically activating the electrical power source and conductive means to selectively and directly kill the mites on the drone larvae and pupae in the drone bee cells in the drone bee comb without electrifying the at least one honeycomb.

21. The bee hive of claim 20 wherein the power source is a DC battery.

22. The beehive of claim 20 wherein the means for conducting electricity are electrical elements mounted across the support member, wherein the elements directly treat the drone larvae and pupae in the drone bee cells in the drone bee comb to kill any mites on the drone larvae and pupae therein.

23. The beehive of claim 22 wherein the elements are mounted in parallel across the face of the support member.

24. The beehive of claim 22 wherein the elements are mounted in the support member.

25. The beehive of claim 22 wherein the elements are resistance heating elements.

26. The honey bee hive of claim 20 which further includes a means for measuring temperature mounted on or within the support member or a means for measuring current connected to the means for conducting electricity to determine the temperature of the drone bee cells when the means for conducting electricity are connected to the electrical power source.

27. In a support member for use in a beehive, which includes a plurality of combs, which support member provides a foundation or a comb for drone bee cells on at least one face thereof for drone bee egg laying by a queen bee in the drone bee cells and subsequently drone bee larvae and pupae from the eggs in the drone bee cells of the comb, the improvement which comprises:

means for conducting electricity adjacent to the support member or within the support member, which means for conducting electricity can be electrically connected to a power source to directly treat the drone larvae and pupae in the drone bee cells in the comb and to selectively and directly kill mites on the drone bee larvae and pupae without electrifying other combs for honey and bees in the beehives.

28. The support member of claim 27 wherein the means for conducting electricity are electrical elements which produce a spark between gaps in the wires in the drone bee cells in the comb.

29. The support member of claim 28 wherein the means for conducting electricity are resistance heating elements.

30. The support member of claim 27 which further includes a means for measuring temperature mounted on or within the support member or a means for measuring current connected to the means for conducting electricity to determine the temperature of the drone bee cells when the means for conducting electricity are electrically connected to the power source.

* * * * *